(12) United States Patent
Yu

(10) Patent No.: US 11,653,646 B2
(45) Date of Patent: May 23, 2023

(54) BIFUNCTIONAL PLANT PROMOTER AND PREPARATION THEREOF

(71) Applicant: Vulpes Agricultural Corp., St. Louis, MO (US)

(72) Inventor: Dihu Yu, Wellesley Hills, MA (US)

(73) Assignee: Vulpes Agricultural Corp., St. Louis, MO (US)

( * ) Notice: Subject to any disclaimer, the term of this patent is extended or adjusted under 35 U.S.C. 154(b) by 441 days.

(21) Appl. No.: 16/837,713

(22) Filed: Apr. 1, 2020

(65) Prior Publication Data

US 2020/0305424 A1   Oct. 1, 2020

Related U.S. Application Data

(60) Provisional application No. 62/827,344, filed on Apr. 1, 2019.

(51) Int. Cl.
| | | |
|---|---|---|
| *C09C 1/48* | (2006.01) | |
| *A01N 37/00* | (2006.01) | |
| *C01B 32/05* | (2017.01) | |
| *C09C 1/56* | (2006.01) | |

(52) U.S. Cl.
CPC .............. *A01N 37/00* (2013.01); *C01B 32/05* (2017.08); *C09C 1/48* (2013.01); *C09C 1/565* (2013.01)

(58) Field of Classification Search
CPC ..................................................... C09C 1/565
See application file for complete search history.

(56) References Cited

U.S. PATENT DOCUMENTS

| | | | |
|---|---|---|---|
| 3,023,118 A | 2/1962 | Donnet | |
| 3,398,009 A | 8/1968 | Deery | |
| 4,366,138 A * | 12/1982 | Eisenmenger | C09C 1/565 |
| | | | 423/449.1 |
| 6,123,759 A * | 9/2000 | Mise | C09D 11/17 |
| | | | 106/478 |
| 6,852,156 B2 | 2/2005 | Yeh et al. | |
| 8,728,432 B2 * | 5/2014 | Arai | C09C 1/58 |
| | | | 264/105 |
| 10,071,335 B2 | 9/2018 | Lee | |
| 2002/0014184 A1 | 2/2002 | Yeh et al. | |
| 2017/0037253 A1 * | 2/2017 | Hardman | C01B 32/00 |

FOREIGN PATENT DOCUMENTS

| | | |
|---|---|---|
| CN | 100513309 C | 7/2009 |
| CN | 105110878 A | 12/2015 |
| CN | 106517142 A | 3/2017 |
| CN | 107022112 B | 8/2017 |
| CN | 108129196 A | 6/2018 |
| CN | 108342100 A | 7/2018 |
| JP | 2001180921 A | 7/2001 |
| WO | 1998030638 A1 | 7/1998 |
| WO | 2018039991 A1 | 3/2018 |
| WO | 2018040632 A1 | 3/2018 |
| WO | 2018064957 A1 | 4/2018 |

OTHER PUBLICATIONS

Bhati, A., et al., "Exploration of Nano Carbons in Relevance to Plant Systems," 2018, New Journal of Chemistry, 42/20:16411-16427, DOI: 10.1039/c8nj03642, 17 Pages.

Cheng, J., et al., "Effects of Modified Nanoscale Carbon Black on Plant Growth, Root Cellular Morphogenesis, and Microbial Community in Cadmium-Contaminated Soil," 2020, Environmental Science and Pollution Research, 27/15:18423-18433. Abstract Only.

Cheng, J., et al., "Effects of Nanoscale Carbon Black Modified by HNO3 on Immobilization and Phytoavailability of Ni in Contaminated Soil," 2015, Journal of Chemistry, vol. 2015, Art. ID 839069, 7 Pages.

Rayle, D.L., "The Acid Growth Theory of Auxin-Induced Cell Elongation is Alive and Well," 1992, Plant Physiology, 99/4:1271-1274, 4 Pages.

Sekhon, B.S., "Nanotechnology in Agri-Food Production: An Overview," 2014, Nanotechnol Sci Appl, 7:31-53, 23 Pages.

USDA Technical Evaluation Report "Oxicized Lignite/Humic Acid Derivatives—Crops," Jul. 7, 2012, The Organic Center for the USDA National Organic Program, PO# AG-6395-C-11-0146, 11 Pages.

Villagarcia, H., et al., Surface Chemistry of Carbon Nanotubes Impacts the Growth and Expression of Water Channel Protein in Tomato Plants, 2015, Nano-Micro Small Communication, 8/15:2328-2334, Abstract Only.

Wang, X., et al., "Evaluation and Mechanism of Antifungal Effects of Crbon Nanomaterials in Controlling Plant Fungal Pathogen," 2014, Carbon, 68:798-806, Abstract Only.

The Complete Aqueous Nitric Acid Solutions Density-Concentration Calculator, HANDYMATH, Dec. 15, 2010 (Dec. 15, 2010), [retrieved May 31, 2021 (May 31, 2021) via <https://web.archive.org/web/201 O 1215232527/http://handymath.com/cgi-bin/nitrictble2.cgi?submit=Entry> ], 2 pages.

Ozone Decomposition LENNTECH, Sep. 24, 2009 (Sep. 24, 2009), p. 1, [retrieved Jun. 1, 2021 (Jun. 1, 2021) via <https://web.archive.org/web/20090924090802/https://www.lenntech.com/library/ozone/decom position/ozone-decomposition.htm>], 3 Pages.

International Preliminary Report on Patentability issued in International Application No. PCT/US21/25205, dated Sep. 29, 2022, 6 pages.

International Search Report and Written Opinion issued in International Application No. PCT/US21/25205, dated Jul. 9, 2021, 9 pages.

* cited by examiner

*Primary Examiner* — Stuart L Hendrickson
(74) *Attorney, Agent, or Firm* — Stinson LLP

(57) ABSTRACT

A bifunctional plant growth promoter and methods of preparing the plant growth promoter. The plant growth promoter comprises nano carbon black modified with carboxyl groups referred to as "carbon black acid". The nano carbon black has a structure forming a first functional part of the plant growth promoter and the carboxyl groups form a second functional part of the plant growth promoter. The plant growth promoter has an average particle size in a size range of 5 nm to 200 nm and a mass fraction of carboxyl groups in a mass fraction range of 5% to 25%.

15 Claims, 14 Drawing Sheets
(13 of 14 Drawing Sheet(s) Filed in Color)

Mass of Nitric Acid Solution to Nano Carbon Black = 1:10
Concentration of Nitric Acid Solution = 30 %
Temperature = 110 °C Mass of Nitric Acid Solution to Nano Carbon Black = 1:10
Pressure = 3 bar
Temperature = 110 °C Concentration of Nitric Acid Solution = 40 %
Pressure = 3 bar
Temperature = 110 °C Concentration of the Nitric Acid Solution = 40 %
Pressure = 3 bar
Mass of Nitric Acid Solution to Nano Carbon Black = 1:10

Temperature = 100 °C
Mass Ratio of Nano Carbon Black to $H_2O$ = 1:100
Gas Flow Rate = 3 L/hr/$g_{carbon\ black}$ Ozone Produced from Oxygen
Mass ratio of Nano Carbon Black to $H_2O$ = 1:100
Gas Flow Rate = 3 L/hr/$g_{carbon\ black}$ Ozone Produced from Oxygen
Mass ratio of Nano Carbon Black to $H_2O$ = 1:100
Gas Flow Rate = 3 L/hr/$g_{carbon\ black}$

BIFUNCTIONAL PLANT PROMOTER AND PREPARATION THEREOF

CROSS-REFERENCE TO RELATED APPLICATION

Applicant claims benefit of and priority to U.S. Provisional Patent Application No. 62/827,344, filed on Apr. 1, 2019, which is incorporated herein by reference in its entirety.

BACKGROUND

The present disclosure relates to a plant growth promoter, and more particularly, to a bifunctional plant promoter and methods for preparing the promoter. A bifunctional plant promoter is a nano-scale complex amorphous carbon-based compound having oxygen-containing groups such as carboxyl groups. The disclosed bifunctional plant promoter, which applicant refers to as "carbon black acid," comprises nano carbon black modified with carboxyl groups.

Auxins, which consist of an aromatic ring linked to a carboxyl functional group, are a class of plant hormones or plant growth regulators that coordinate many growth and behavior processes in a plant's life cycle and are essential for plant body development. For example, auxins affect plant cell elongation and division. One common, naturally occurring auxin is indole-3-acetic acid. This acid promotes plant growth at low concentrations but inhibits growth at relatively high concentrations. According to one theory, the acidity of the carboxyl structure in auxins promotes plant cell elongation by activating and increasing proton pump H+-ATPase in the cell membrane, leading to the proton efflux and acidification of the cell wall, activating dilatation proteins in the cell wall and weakening hydrogen bonds between the cell wall polysaccharide groups. (RAYLE, D. L. *Plant Physiology,* 1992, 99(4): 1271-1274.) As a result, the cell wall relaxes, allowing the cell to elongate. This acid growth theory suggests the acidity of auxins plays an important role in promoting plant growth.

Humic acid is a natural oxide of carbon that acts as a plant promoter. It has been reported that humic acid is a complex, uncontrolled oxidation mixture containing functional groups such as carboxyl groups and phenolic hydroxyl groups, mainly formed from the decomposition of organic matter in the soil or low oxidation fossil materials. (U.S. Department of Agriculture Technical Evaluation Report entitled, "Oxidized Lignite/Humic Acid Derivatives—Crops" compiled by The Organic Center for the USDA National Organic Program, PO #AG-6395-C-11-0146, Jul. 7, 2012.) Though the humic acid has a recognized plant-promoting effect, and its derivatives also have certain applications in fertilizers, feeds, and pigments, problems associated with commercially producing humic acid have not been solved, preventing its widespread use. Processes to obtain humic acid from soil or low oxidation fossil materials have low efficiency. Processes to obtain humic acid from high oxidation coal result in impurities, including aromatic polycarboxylic acids, such as benzoic acid or phthalic acid, or small molecular organic substances, such as oxalic acid or malonic acid, which are environmental pollutants and increase cancer risks.

Besides acidity, nanomaterials have been found to promote plant growth. It has been reported that nano-scale materials could increase crop yields to varying degrees. (SEKHON, B. S. "Nanotechnology in agri-food production: an overview,"*Nanotechnol Sci Appl,* 2014, 7:31.) Different forms of nano carbon play a positive role in promoting plant growth. Other investigators found that nano carbon cannot only promote the absorption of nutrients such as calcium and iron but also significantly increase the crop yields. (VILLAGARCIA, H. et al. "Surface Chemistry of Carbon Nanotubes Impacts the Growth and Expression of Water Channel Protein in Tomato Plants," *Small,* 2015, 8(15):2328-34.) Still others showed that the porous structure of nano carbon quickly absorbed harmful substances such as heavy metals, resulting in plants absorbing pollutants when nano carbon is mixed in fertilizer. (Chinese Patent Publication CN18129196.) Moreover, X. Wang et al. showed that nano carbon could retain moisture and phytonutrients, and resist plant pathogenic fungi. (WANG, X., et al., "Evaluation and Mechanism of Antifungal Effects of Carbon Nanomaterials in Controlling Plant Fungal Pathogen," *Carbon,* 2014, 68:798-806.)

In addition to solid nano carbon, nano carbon solutions generated by dispersing nano carbon in water have had similar effects. WIPO Patent Publications WO2018064957A1 and WO2018039991A1 disclosed that nano carbon solutions interact with plants, microorganisms, and soil environment to induce or regulate biosynthesis and metabolic pathways. Japanese Patent Publication JP2001180921A showed that the colloid formed by fine carbon powder dispersed in water enriched nutrients, removed or adsorbed impurities, absorbed water and far-infrared heat, and caused other soil improvements.

Chinese Patent Publication CN 100513309C proposed a method for obtaining nano carbon solutions using graphite electrodes at low pressure to disperse nano carbon in aqueous solution. Chinese Patent Publication CN106517142A proposed a method for obtaining nano carbon solutions by high-voltage electrolysis of conductive carbon between two electrodes in a carbon solution having particular conductivity. Chinese Patent Publication CN105110878A disclosed obtaining a nanofluid by dispersing nano carbon black in water using penetrating agents, dispersing agents, and surfactants. These patent publications discuss using different methods to modify nano carbon to improve its dispersion in water. However, in practice, electrolysis methods are difficult to quantitatively control, increasing product variabilities. And, the chemical dispersion methods present safety hazards due to the chemicals used.

WIPO Patent Publication WO1998030638A1 disclosed that carbon black could be oxidized by ozone to hydrophilize the surface of the carbon black to improve its dispersion stability when making a pigmented ink that did not bleed or clog the pen nib in use. Although the total amount of acid groups per unit specific surface area reached more than 3 μequiv/$m^2$ after oxidation, the amount of oxidated carbon black made by the process was extremely low. U.S. Pat. No. 6,852,156 disclosed a method for preparing self-dispersing carbon black pigments, which are stably dispersed and not agglomerated in water, by ozonation and high-speed shearing, but the acid value of the carbon black was less than 3 μmol/$m^2$, and the pH was 6-8.

Currently, oxidized nano carbon black is primarily obtained using the following methods:

1. Patent Publication CN 108342100A proposed a dry oxidation treatment method, which increased the dispersibility of carbon black in water by ozone.
2. Patent Publication CN 107022112B proposed a wet oxidation treatment method, using nitric acid solution to graphene a carbon black surface, producing carbon black as rubber filler to improve rubber properties. U.S.

Pat. No. 3,023,118 proposed a method of using nitric acid solution to improve the dispersibility of carbon black in water.

3. Patent Publications CN100513309C, WO2018040632A1, and WO2018039991A1 proposed a method for obtaining carbon-based material by low-voltage electrolysis of graphite. $Sp^2$-skeleton carbon or natural graphite was used as a raw material. The inorganic substance was converted into the organic substance. In each of these methods, the nano carbon obtained by electrolysis would also be oxidized. The oxidation was not controllable so small-molecule aromatic polycarboxylic acids would easily form, causing pollution. In addition, oxidizing nano carbon by electrolysis is expensive and not suitable for commercial manufacture.

There is a continuing need for plant growth promoters that improve plant growth and production, as well as, a need for processes for reliably producing the promoters.

SUMMARY

In one aspect, the present disclosure includes a plant growth promoter, comprising nano carbon black modified with carboxyl groups. The nano carbon black has a structure forming a first functional part of the plant growth promoter and the carboxyl groups form a second functional part of the plant growth promoter.

In another aspect, the present disclosure includes a method of preparing plant growth promoter comprising nano carbon black modified with carboxyl groups. The method comprises controllably oxidizing nano carbon black using at least one oxidizing agent selected from a group of oxidizing agents consisting of ozone, nitric acid, hydrogen peroxide, persulfates, and hypohalites.

In still aspect, the present disclosure includes a method of preparing plant growth promoter comprising nano carbon black modified with carboxyl groups. The method comprises controllably oxidizing nano carbon black using nitric acid by introducing oxygen into a vessel containing nano carbon black in nitric acid dispersion at a preselected pressure until a resulting solution in the vessel has a mass fraction of carboxyl groups in a mass fraction range of 5% to 25%. The method further comprises separating agglomerated solids from the resulting solution and washing the agglomerated solids with water until the solids are separated into said plant growth promoter.

In yet aspect, the present disclosure includes a method of preparing plant growth promoter comprising nano carbon black modified with carboxyl groups. The method comprises controllably oxidizing nano carbon black using ozone by introducing ozone into a vessel containing nano carbon black in aqueous dispersion while stirring until a resulting intermediate solution in the vessel has a mass fraction of carboxyl groups in a mass fraction range of 5% to 25%. The method further comprises removing residual ozone from the resulting intermediate solution to produce a final solution and drying the final solution to produce said plant growth promoter.

Other aspects of the present invention will be apparent in view of the following description and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DISCLOSURE

Figure 1A:
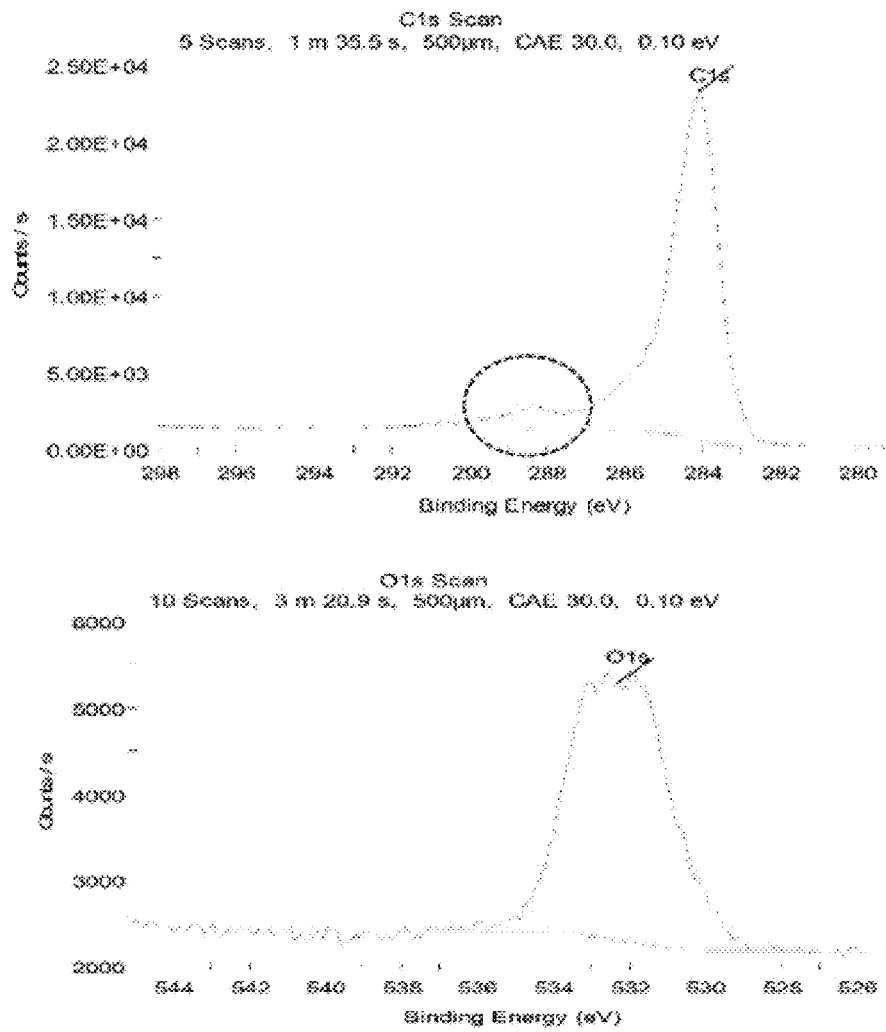
FIGS. 1a and 1b are graphs showing characterization of carbon black and carbon black acid by XPS.

The present disclosure describes carbon black nano particles, or "nano carbon black," being oxidized by controllable chemical oxidation to obtain a bifunctional plant promoter, which this applicant refers to as "carbon black acid." The described carbon black acid has an average particle size in a range of about 5 nm to about 200 nm. Further, the described carbon black acid contains about 5 wt % to about 25 wt % carboxyl groups.

As discussed above, auxins promote plant growth. As reported, the mechanism by which auxins promote growth is that the acidity of the carboxyl structures in auxins promotes plant cell elongation by activating and increasing proton pumping H+-ATPase in cell membranes, leading to the proton efflux, acidification of the cell wall, activation of dilatation proteins in the cell wall, and the weakening of hydrogen bonds between the cell wall polysaccharide groups. In addition, as a nano material, nano carbon has been shown to have a beneficial role in nitrogen fixation, plant growth, and other aspects. Thus, applicant hypothesized that nano carbon material modified with carboxylic acid functional groups, i.e., carbon black acid, would have advantages of both auxins and nano carbon. This hypothesis, however, could not be confirmed before developing reliable methods for modifying nano carbon black with carboxyl groups.

Nano carbon black is a common nano carbon material having nano-scale particle sizes, but poor dispersibility. Pure water or organic solvents do not stably disperse nano carbon black. Although others developed methods for modifying nano carbon or nano carbon black, the purpose of those methods was to improve the dispersion of nano carbon. Further, the carboxyl content in the nano carbon was not controllable using prior methods. Therefore, the plant growth promoting effects of acidic groups on the surface of nano carbon were not discoverable.

Having modified nano carbon black with carboxyl groups using controllable chemical oxidation to obtain a bifunctional plant promoter, carbon black acid, applicant was able determine that when carbon black acid had less than about 5 wt % carboxylic acid, the carbon black acid does not cause appreciable plant growth. In addition, applicant was able determine that the nano carbon black readily over-oxidizes, forming small molecules such as aromatic polycarboxylic acids that reduce the yield of carbon black acid, when the carbon black acid had more than about 25 wt % carboxylic acid. Therefore, applicant determined an effective amount of carboxyl group in carbon black acid that was producible and effective as a bifunctional plant promoter. That effective amount of carboxyl group in carbon black acid is in the range of between about 5% and about 25%.

A plurality of controllable chemical oxidation methods are envisioned for preparing the carbon back acid, including ozone, nitric acids, hydrogen peroxides, persulfates, and hypohalites as oxidants. Two methods for preparing carbon black acid and corresponding procedures for optimizing process parameters in the methods are described below.

A. Nitric Acid Oxidation Method

Using nitric acid oxidation method, oxygen is introduced into a vessel holding nano carbon black in nitric acid dispersion at a specific pressure until the carboxyl content reaches a range of about 5% to about 25%. Bifunctional plant promoter, i.e., carbon black acid, is obtained after separation and washing.

The average particle size of the nano carbon black held in the vessel is in a range of 5 nm to about 200 nm. The nitric acid concentration is in a range of about 10% to about 40%, and more particularly in some examples, in a range of about 15% to about 30%. The mass ratio of nano carbon black to nitric acid solution is in a range of about 1:1 to about 1:30, and more particularly in some examples, in a range of about 1:5 to about 1:10. Temperature in the vessel maintained in a range of about 60° C. and about 150° C., and more particularly in some examples, in a range of about 100° C. to about 120° C. Pressure in the vessel is maintained in a range of about 1 bar to about 10 bar, and more particularly in some examples, in a range of about 4 bar to about 6 bar. The resulting crude bifunctional plant promoter is washed with water several times until the promoter is no longer agglomerated. The crude bifunctional plant promoter is separated from the solution using conventional methods such as centrifugal separation and/or evaporation.

The ratio of reactants, the nitric acid concentration, the reaction temperature, and the reaction time were investigated to determine how to control oxidation using the nitric acid oxidation method. High solid-to-liquid ratios caused poor fluidity during the liquid phase, decreasing reaction rate and carboxylic acid content. Low solid-to-liquid ratios negatively impacted reaction efficiency, generating a large amount of waste acid. A nano-carbon-to-nitric-acid mass ratio in a range of about 1:5 to about 1:10 was found to provide a sufficient reaction rate and carboxylic acid content without producing large amounts of waste acid. Further, low nitric acid concentration required high reaction temperature, and high nitric acid concentration resulted in excessive oxidation, potentially causing environmental pollution. A nitric acid concentration in a range of about 15% to about 30% was found to allow appropriate reaction temperatures and suitable excessive oxidation. Temperature also played an important role in the reaction. High temperature caused rapid evaporation and decomposition of nitric acid. In addition, high reaction rates excessively oxidized the nano carbon black. A reaction temperature in a range of about 100° C. to about 120° C. was found to provide satisfactory results. Nano carbon black oxidation increased over time. Stopping the oxidation reaction when the carboxyl group content reaches a range of about 5% to about 25% was found to provide an effective amount of carboxyl groups in the carbon black acid. Further, introducing oxygen into the liquid phase oxidizes nitrogen oxide and nitrogen dioxide to regenerate nitric acid, avoiding environmental pollution by reducing nitric acid and nitrogen oxide emissions.

B. Ozone Oxidation Method

Using the ozone oxidation method, nano carbon black in aqueous dispersion is stirred in a vessel. Ozone is introduced into the nano carbon black in aqueous dispersion as it is mixed until the carboxyl content reaches a range of about 5% to about 25%. The ozone may be generated from either air or oxygen. The nano carbon black has an average particle size in a range of 5 nm to about 200 nm. The rate at which ozone is introduced is in a range of about 0.3 $L/hr/g_{carbon\ black}$ to about 15 $L/hr/g_{carbon\ black}$. The mass ratio of nano carbon black to water is in a range of about 1:10 to about 1:150, and more particularly in some examples, in a range of about 1:20 to about 1:100. The ozone concentration is in a range of about 2% to about 10%, and more particularly in some examples, in a range of about 5% to about 10%. Temperature in the vessel is maintained in a range of about 30° C. and about 100° C., and more particularly in some examples, in a range of about 50° C. to about 100° C. Residual ozone is removed by heating, and evaporation is used to separate the crude bifunctional plant promoter from the solution.

The ratio of reactants, the reaction temperature, and the reaction time were investigated to determine how to control the amount of oxidation when using the ozone oxidation method. Increasing the amount of solvent to increase the absolute amount of ozone in the reaction system was found to improve the reaction efficiency due to the gas-liquid phases reaction. A mass ratio of nano carbon black to water in a range of about 1:20 to about 1:100 was found to provide a suitable amount of ozone. Holding reaction temperature within a range of about 50° C. to about 100° C. was found to avoid decomposition of ozone.

As those skilled in the art will appreciate, other methods of oxidation could be used. The investigations and optimization procedures outlined above are representative of the investigations and procedures needed to confirm and optimize the other methods. Thus, it is believed that the other methods are sufficiently reduced to practice by this disclosure to provide support for these methods if recited in claims of applications having priority to this application.

Surprisingly, nano carbon black can be functionalized by controlled oxidation to form certain numbers of carboxyl functional groups on the surface of the nano carbon black particles and to provide a macromolecular carbonic acid similar to auxin structure can be obtained. Applicant refers to this macromolecular carbonic acid as "carbon black acid". Carbon black acid comprises nano carbon black particles having a carboxylic acid functional group on its surface and has both nanostructure and acidic functional groups. After being functionalized, the nano carbon black provides the dual functions of auxin analogs and nano carbons, such as improving nutrients, nitrogen, fat, and far-infrared absorption, as well as, removing or adsorbing impurities and moisture, and providing anti-bacterial benefits.

As noted above, the particle size of nano carbons used in the processes is in a range of about 5 nm to about 200 nm.

After functionalizing the nano carbon black, e.g., using the methods described above, most of the nano carbon black continues to have particle sizes in the specified range, thereby meeting the particle sizes necessary for nano carbons. In addition, the carbon black acid readily disperses uniformly in water for extended periods of time due to the acidic hydrophilic groups on the surface.

Using the methods described above allow oxidation and the number of carboxyl functional groups on the surface of the nano carbon black to be controlled. When the mass fraction of carboxyl group in the carbonic acid is less than about 5%, the dispersion performance of carbon black acid is poor. The low acid value and few carboxylic acid functional groups prevent carbon black acid from functioning as an auxin analog. When the mass fraction of carboxyl groups in carbon black acid is above about 25%, due to excessive oxidation, a large amount of nano carbon black is oxidized into carbon dioxide discharged into the atmosphere, wasting raw materials and emitting greenhouse gases. In addition, higher oxidation amounts produce small molecular aromatic polycarboxylic acid by-products that are harmful to the environment and pose a risk of cancer. Controlling the mass fraction of the carboxyl group in carbon black acid to be within a range of about 5% to about 25% reduces these harmful effects.

The present disclosure describes preparing the bifunctional plant promoter, carbon black acid, having an average particle size range of about 5 nm to about 200 nm and a mass fraction of carboxyl groups in range of about 5% to about 25% by controllably oxidizing nano carbon black. The carbon black acid contains two functional parts, the nano carbon structure and carboxyl groups, to efficiently promote plant growth.

EXAMPLES

The following examples are intended to be illustrative only and are not intended to restrict the scope of the claims or disclosure.

Example 1

Figure 1B:
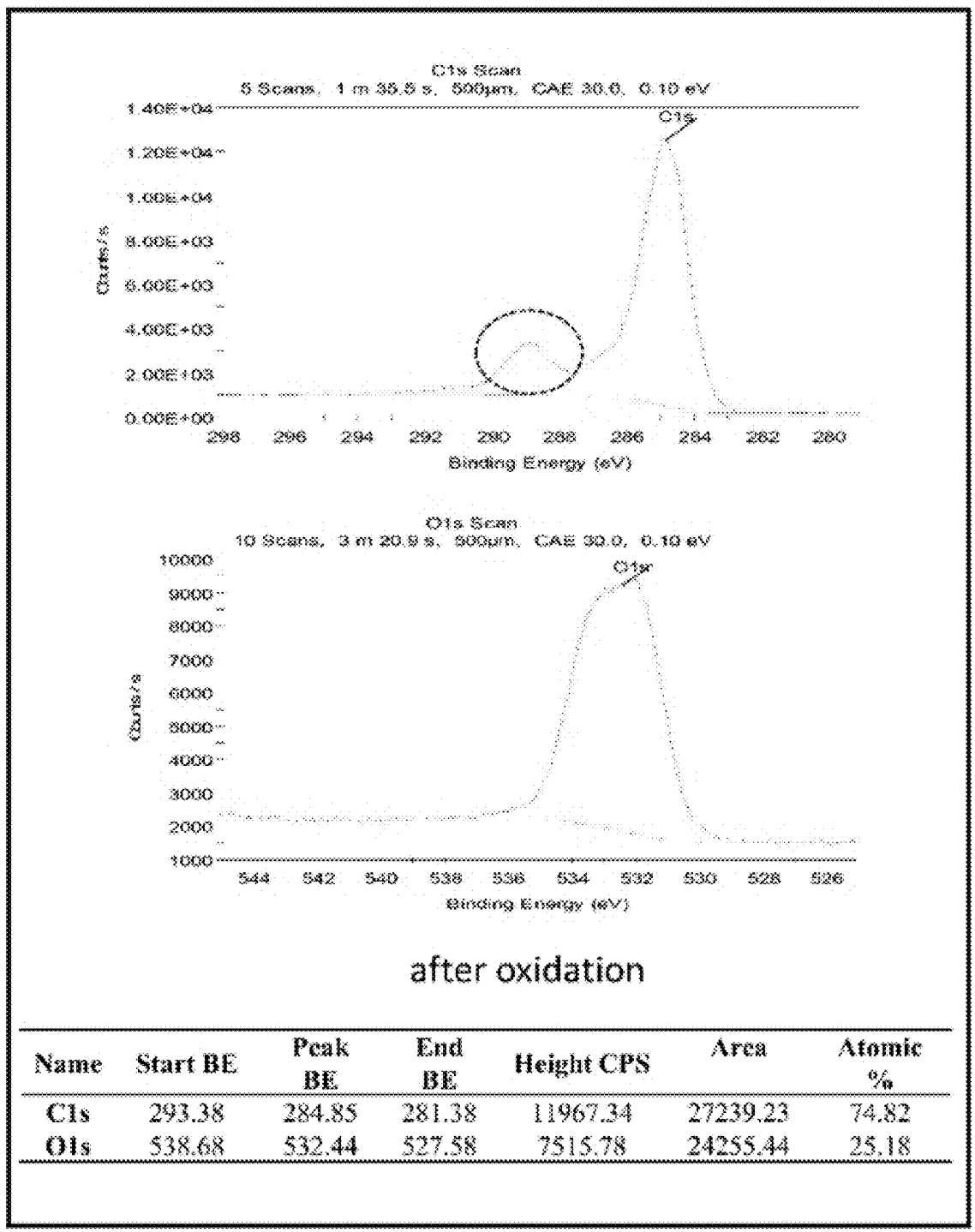
Figure 2:
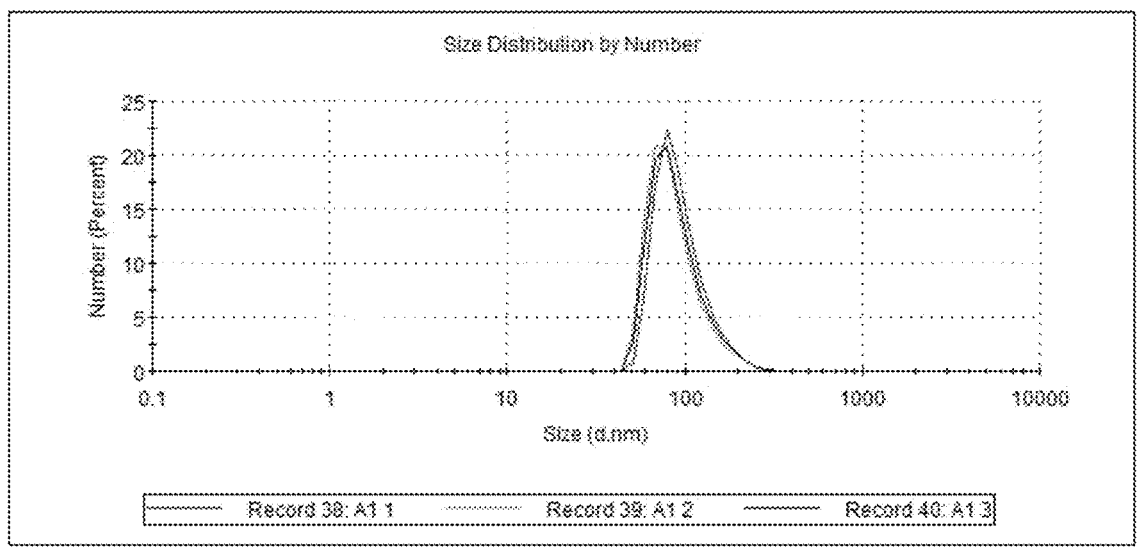
FIG. 2 is a graph showing the particle size distribution of carbon black acid.
Figure 3:
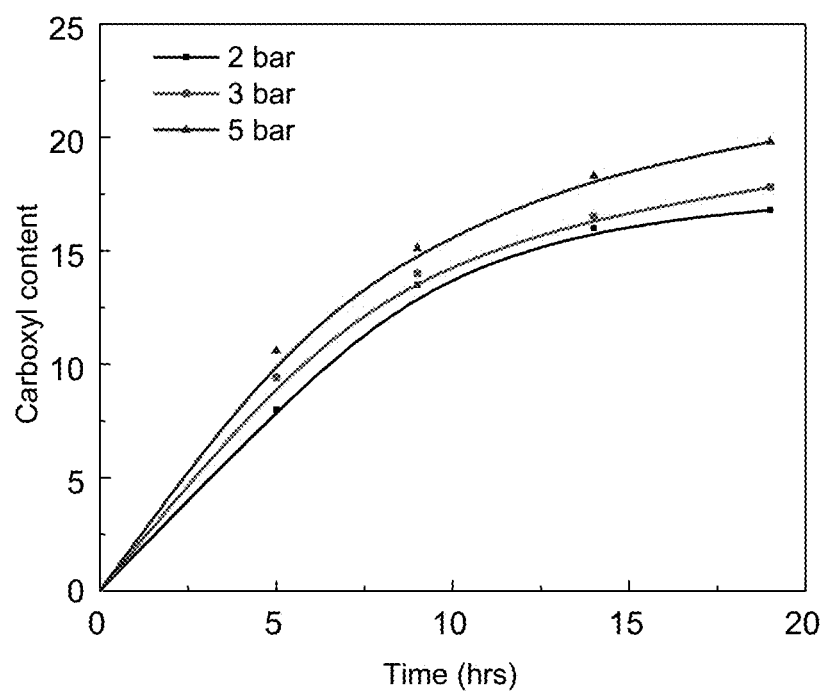
FIG. 3 is a graph showing the effect of pressure on the carboxylic acid content in nitric acid oxidation.
Figure 4:
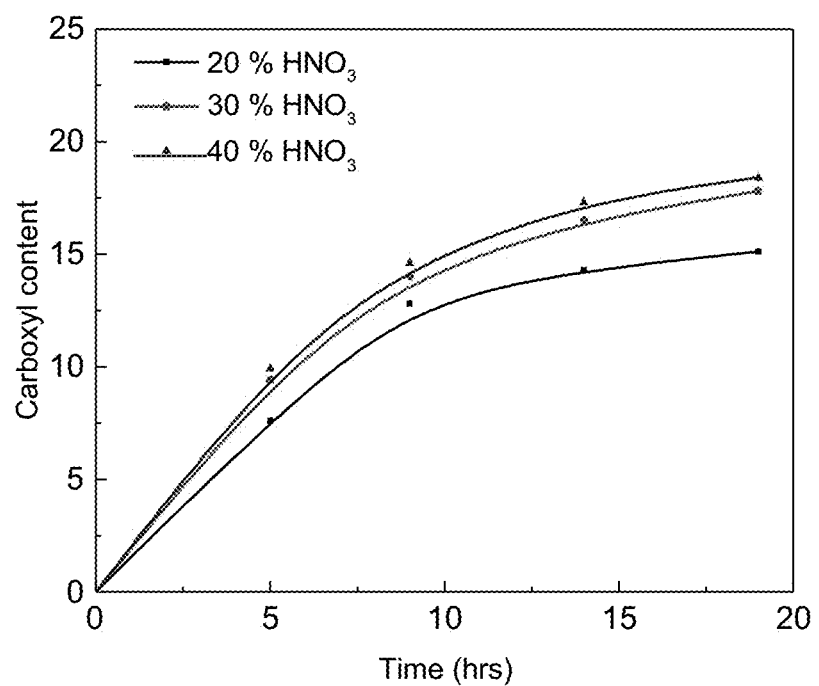
FIG. 4 is a graph showing the effect of nitric acid concentration on the carboxylic acid content in nitric acid oxidation.
Figure 5:
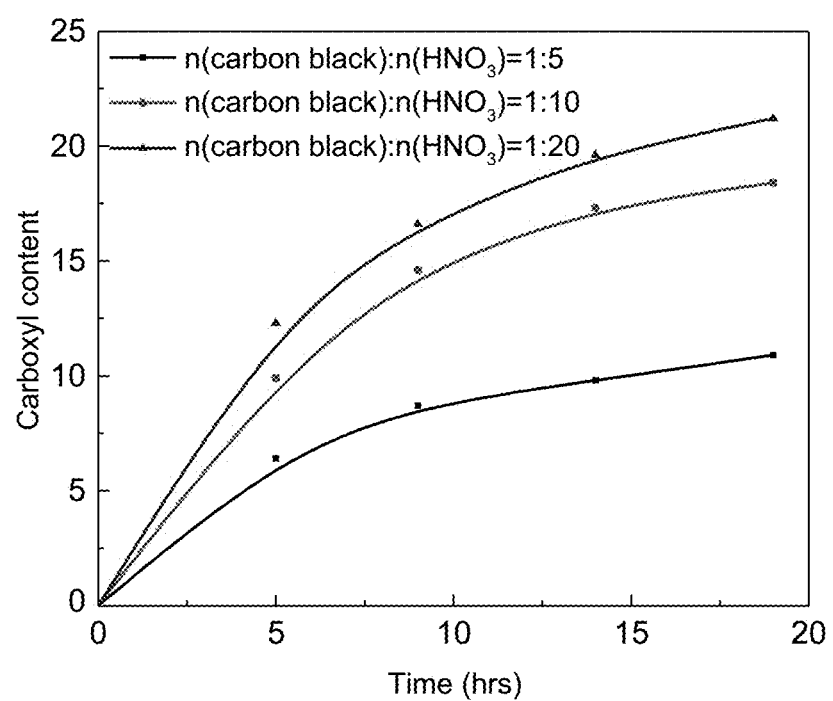
FIG. 5 is a graph showing the effect of the mass ratio of reactants on the carboxylic acid content in nitric acid oxidation.
Figure 6:
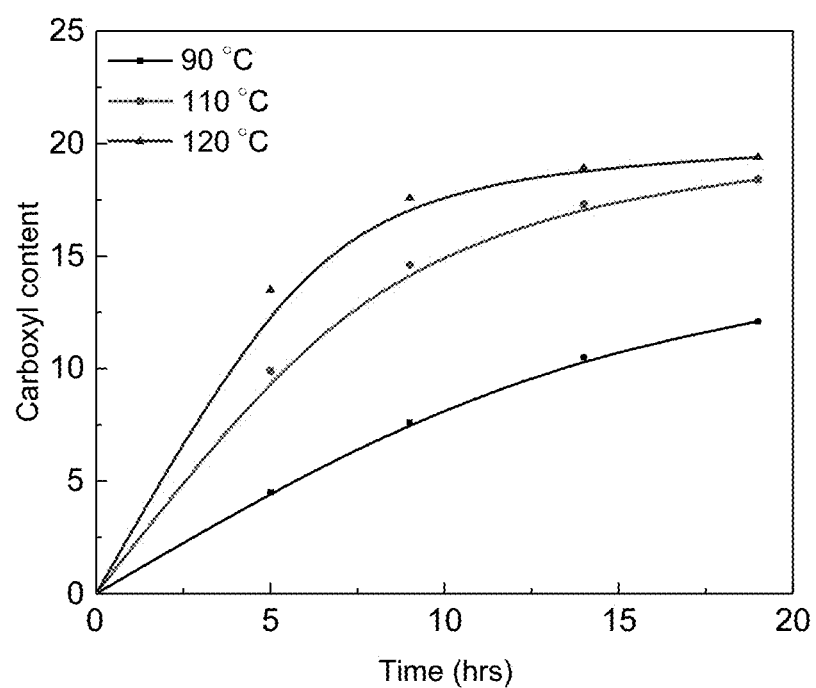
FIG. 6 is a graph showing the effect of temperature on the carboxylic acid content in nitric acid oxidation.
Figure 7:
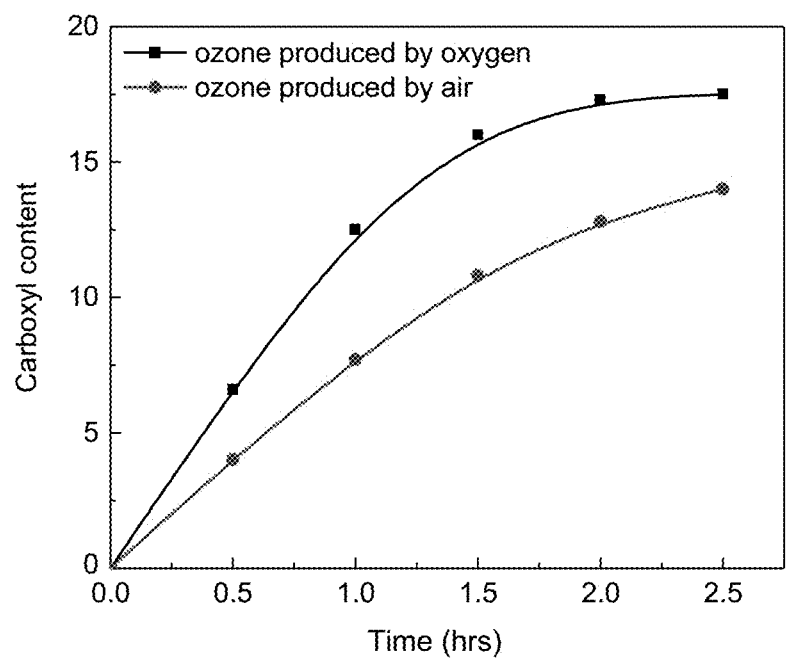
FIG. 7 is a graph showing the effect of the ozone source on the carboxylic acid content in ozone acid oxidation.
Figure 8:
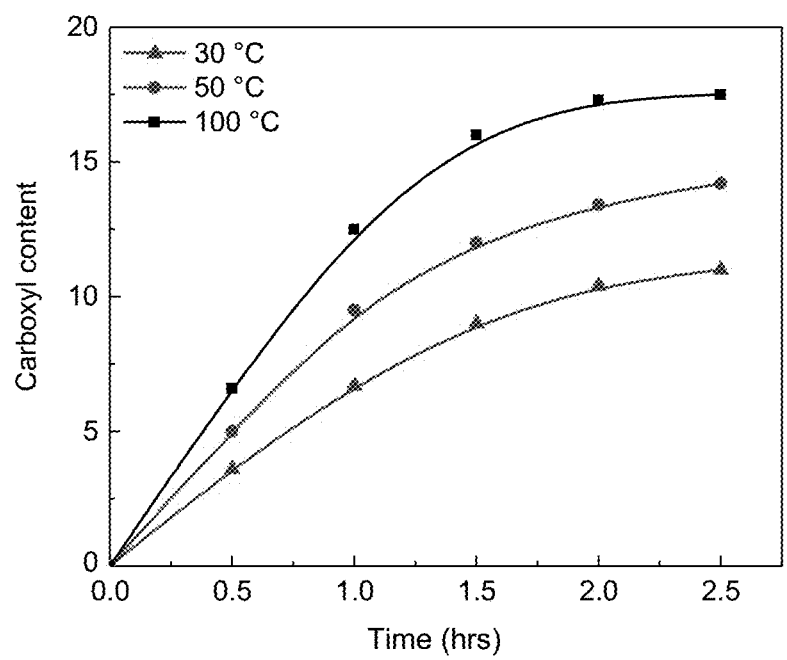
FIG. 8 is a graph showing the effect of temperature on the carboxylic acid content in ozone acid oxidation.
Figure 9:
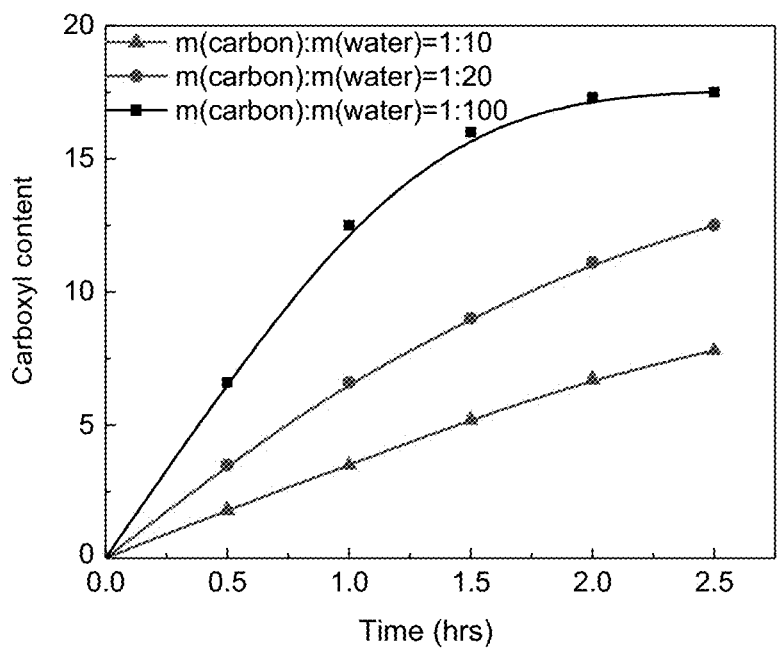
FIG. 9 is a graph showing the effect of the mass ratio of nano carbon black to water on the carboxylic acid content in ozone acid oxidation.
Figure 10:
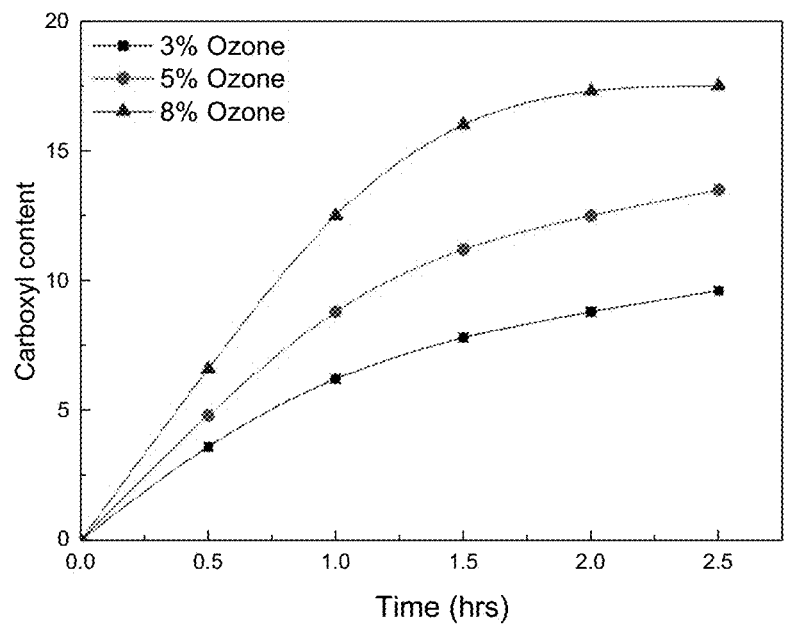
FIG. 10 is a graph showing the effect of ozone concentration on the carboxylic acid content in ozone acid oxidation.
Figure 11:
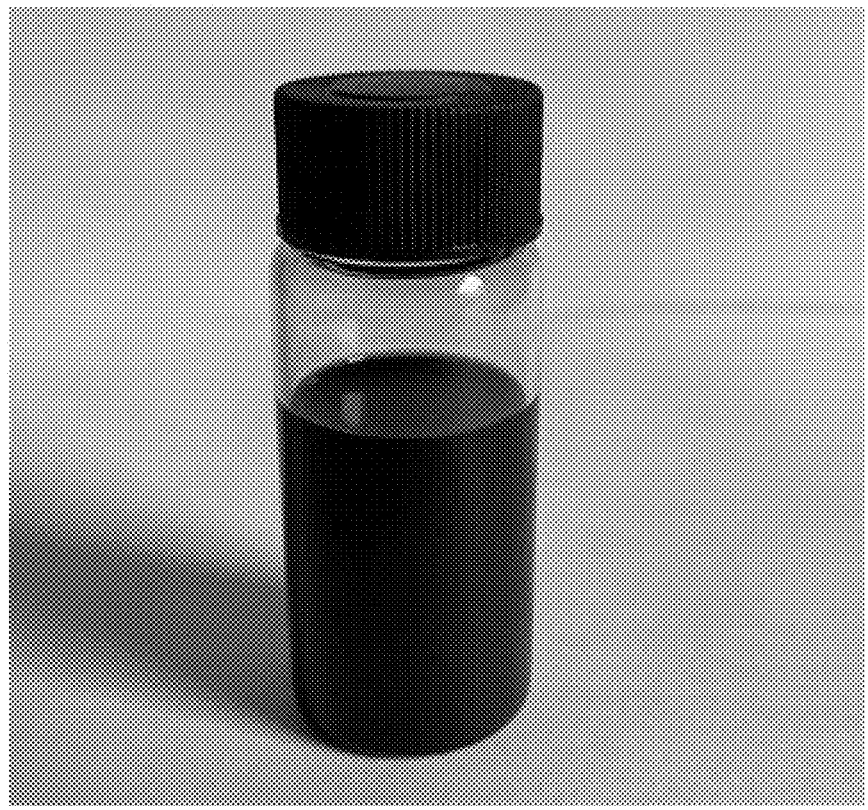
FIG. 11 is a photo of carbon black acid in water solution.
Figure 12:
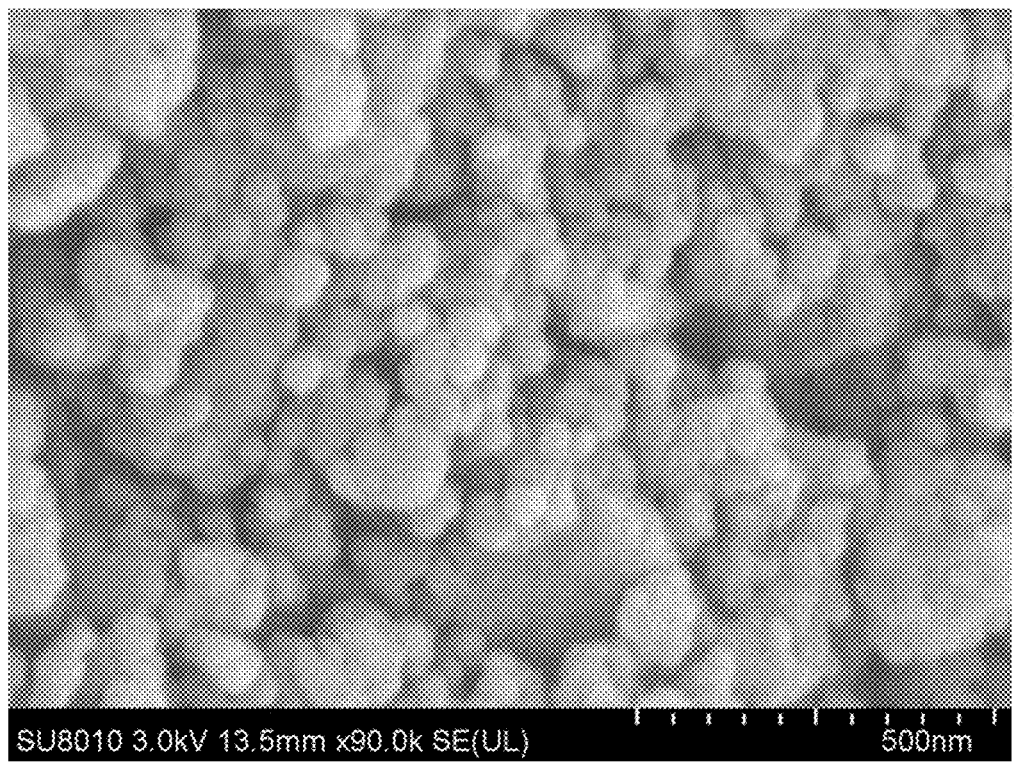
FIG. 12 is a scanning electron microscope image of carbon black acid.
Figure 13:
FIG. 13 is an atomic force microscope image of carbon black acid.

20.0 g nano carbon black having an average particle size of 50 nm was combined with 200.0 g 30% $HNO_3$ solution in a reactor and heated to 110° C. Reaction occurred under a fixed pressure of 3 bar while adding oxygen for 19 hours. After cooling, the reactants were separated by centrifugal separation at 4000 rpm to obtain crude bifunctional plant promoter. Then the crude bifunctional plant promoter was washed with water three times until the promoter was not agglomerated and could not be separated by centrifugal separation. The final bifunctional plant promoter, carbon black acid, was obtained after evaporating the solution and drying. The carboxyl content of the resulting bifunctional plant promoter was 17.8% as measured using the Boehm titration method. The nano carbon black and the carbon black acid were characterized by XPS. The results are shown in FIG. 1. After the nano carbon black controllably oxidized, the peak representing carbon in carboxyl group, —$\underline{C}OO$—, at 289 eV increased, indicating the carboxyl groups were introducing to the nano carbon black after oxidation. The oxygen atom content also increased from 8.63% to 25.18%. The particle size distribution of the carbon black acid was characterized by zeta-potential analysis. The average size of the carbon black acid was 124.7 nm as shown in FIG. 2.

Example 2

The effects of nitric acid concentration, oxygen pressure, reaction temperature and mass ratio of nano carbon black to nitric acid in the nitric acid oxidation were investigated using the procedure described in Example 1. FIGS. 3-6 illustrate carboxyl content as a function of oxidation time for noted reagents and conditions.

Example 3

20.0 g nano carbon black having an average particle size of 50 nm was combined with 2000.0 g water in a 2000 mL reactor with ozone bubbling at 100° C. The concentration of ozone generated by oxygen was 8%, and the gas flow rate was 1 L/min. The reaction was stopped after 2.5 hours. The residual ozone in the solution was removed by heating. The bifunctional plant promoter, i.e., carbon black acid, was obtained after evaporation. The carboxyl content of the bifunctional plant promoter was 17.5% as measured using the Boehm titration method.

Example 4

The effects of ozone source, ozone concentration, reaction temperature, and mass ratio of nano carbon black to water in the ozone oxidation were investigated using the procedure described in Example 3. FIGS. 7-10 illustrate carboxyl content as a function of oxidation time for noted reagents and conditions.

Example 5

Wheat seeds were soaked in the experimental solution for 6 hr. After soaking, 30 seeds of the same size were selected for each group of experiments and cultured in filter dishes with filter paper. One week later, the data of radicle length and germ length in each group were counted. Light was used to maintain temperature in the incubator at 25° C. The humidity was in the range of 80% to 90%. The statistical results are shown in Table 1. The results show that adding carbon black acid has obvious growth promoting effects on radicle and germ, and carbon black acid exerts a bifunctional effect.

TABLE 1

Results for carbon black acid containing 20.3% carboxyl groups promoting wheat seed germination

| Sample | Experimental Solution | Radicle Length (cm) | Radicle Length growth rate | Germ Length (cm) | Germ Length growth rate | Average Rhizome Ratio |
|---|---|---|---|---|---|---|
| 1 | No Additive | $4.46_{-0.32}^{+0.32}$ | — | $2.73_{-0.11}^{+0.12}$ | — | 1.63 |
| 2 | 0.03% Carbon Black Solution | $4.52_{-0.29}^{+0.31}$ | 1.35% | $2.86_{-0.11}^{+0.10}$ | 4.76% | 1.58 |
| 3 | 0.03% Carbon Black Acid Solution | $4.80_{-0.28}^{+0.28}$ | 7.62% | $3.07_{-0.11}^{+0.12}$ | 12.5% | 1.56 |

TABLE 1-continued

Results for carbon black acid containing 20.3% carboxyl groups promoting wheat seed germination

| Sample | Experimental Solution | Radicle Length (cm) | Radicle Length growth rate | Germ Length (cm) | Germ Length growth rate | Average Rhizome Ratio |
|---|---|---|---|---|---|---|
| 4 | 0.06% Carbon Black Acid Solution | $4.62_{-0.31}^{+0.30}$ | 3.59% | $3.16_{-0.10}^{+0.12}$ | 15.8% | 1.46 |

Example 6

Cotton and sugar beet field experiments were performed using 0.3% carbon black acid solution. On the basis of normal planting, 0.3% carbon black acid (carboxyl content 18.3%) solution was added with water, and a blank control group was also set up. The results are shown in Table 2. After the use of carbon black acid, the cotton leaves were larger and darker in color, the stems were thicker, the growth of individual plants was higher, the growth was lush, and the number of bolls per plant was large. It took longer time to fruit comparing to the blanks. The cotton plants were strong lodging resistance after using carbon black acid. During the growth of sugar beet, the leaves are darker and larger. The production of sugar beets was increased by carbon black acid.

TABLE 2

Effect of the carbon black acid containing 18.3% carboxyl groups on cotton and sugar beet yield

| Crop | Area (mu) | Carbon Black Acid Solution (mu/dosage/kg) | Fertilizer (kg/mu) | | | Production growth ratio |
|---|---|---|---|---|---|---|
| | | | Nitrogen Fertilizer | Phosphate Fertilizer | Potash | |
| Cotton | 30 | 25 | 44 | 45 | 26 | 15.6% |
| Sugar Beet | 20 | 20 | 31 | 20 | 25 | 8.2% |

It will be apparent that modifications and variations are possible without departing from the scope of the invention defined in the appended claims.

Insofar as the description above and the accompanying drawings disclose any additional subject matter that is not within the scope of the claims below, the disclosures are not dedicated to the public and the right to file one or more applications to claims such additional disclosures is reserved.

Unless otherwise expressly stated, it is in no way intended that any method or aspect set forth herein be construed as requiring its steps be performed in a specific order. This construction holds for possible non-express bases for interpretation, including matters of logic with respect to arrangement of steps or operational flow, or plain meaning derived from grammatical organization or punctuation.

When introducing elements in this description, the articles "a", "an", "the", and "said" are intended to mean that there are one or more of the elements. The terms "comprising", "including", and "having" are intended to be inclusive and mean that there may be additional elements other than the listed elements.

As those skilled in the art could make various changes to the above constructions, products, and methods without departing from the intended scope of the description, all matter in the above description and accompanying drawings should be interpreted as illustrative and not in a limiting sense.

What is claimed is:

1. A plant growth promoter, comprising: nano particles of carbon black having an exterior surface including carboxyl groups; and
   wherein the plant growth promoter has a mass fraction of carboxyl groups in the range of 17.5% to 25%.

2. The plant growth promoter as set forth in claim 1, wherein the plant growth promoter has an average particle size in a size range of 5 nm to 200 nm.

3. A method of preparing a plant growth promoter comprising nano carbo black having exterior surfaces including carboxyl groups, said method comprising:
   introducing oxygen into a vessel containing nano carbon black in nitric acid dispersion at a preselected pressure until a mass fraction of carboxyl groups on the nano carbon black reaches the range of 17.5% to 25%;
   separating agglomerated solids from the resulting solution; and
   washing the agglomerated solids with water until the solids are separated into the plant growth promoter.

4. The method of preparing the plant growth promoter as set forth in claim 3, wherein the plant growth promoter has an average particle size in a size range of 5 nm to 200 nm.

5. The method of preparing the plant growth promoter as set forth in claim 3, wherein the preselected pressure is within a pressure range of 1 bar to 10 bar.

6. The method of preparing the plant growth promoter as set forth in claim 3, nano carbon black in nitric acid dispersion is made with nitric acid having a concentration within a concentration range of 10% to 40% nitric acid.

7. The method of preparing the plant growth promoter as set forth in claim 3, wherein the nano carbon black in nitric acid dispersion has a mass ratio within a mass ratio range of 1:1 to 1:30.

8. The method of preparing the plant growth promoter as set forth in claim 3, wherein the step of introducing oxygen into the vessel containing nano carbon black in nitric acid dispersion is performed at a preselected temperature in a temperature range of 60° C. to 150° C.

9. A method of preparing a plant growth promoter comprising nano carbo black having exterior surfaces including carboxyl groups, said method comprising:

introducing ozone into a vessel containing nano carbon black in aqueous dispersion while stirring until a resulting intermediate solution in the vessel has a mass fraction of carboxyl groups in the range of 17.5% to 25%;

removing residual ozone from the resulting intermediate solution to produce a final solution; and drying the final solution to produce the plant growth promoter.

10. The method of preparing the plant growth promoter as set forth in claim 9, wherein the plant growth promoter has an average particle size in a size range of 5 nm to 200 nm.

11. The method of preparing the plant growth promoter as set forth in claim 9, wherein the nano carbon black in aqueous dispersion has a mass ratio within a mass ratio range of 1:10 to 1:150.

12. The method of preparing the plant growth promoter as set forth in claim 9, wherein the ozone introduced into the vessel has a concentration within a concentration range of 2% to 10%.

13. The method of preparing the plant growth promoter as set forth in claim 9, wherein the ozone is introduced into the vessel at a gas rate within a gas rate range of 0.3 $L/hr/g_{carbon\ black}$ to 15 $L/hr/g_{carbon\ black}$.

14. The method of preparing the plant growth promoter as set forth in claim 9, wherein the step of introducing ozone into the vessel is performed at a preselected temperature in a temperature range of 30° C. to 100° C.

15. The method of preparing the plant growth promoter as set forth in claim 9, wherein the step of removing residual ozone from the resulting intermediate solution includes heating the resulting intermediate solution.

* * * * *